June 24, 1930. L. B. ANDRESEN 1,767,034
STERILIZER
Filed Sept. 1, 1923    2 Sheets-Sheet 1
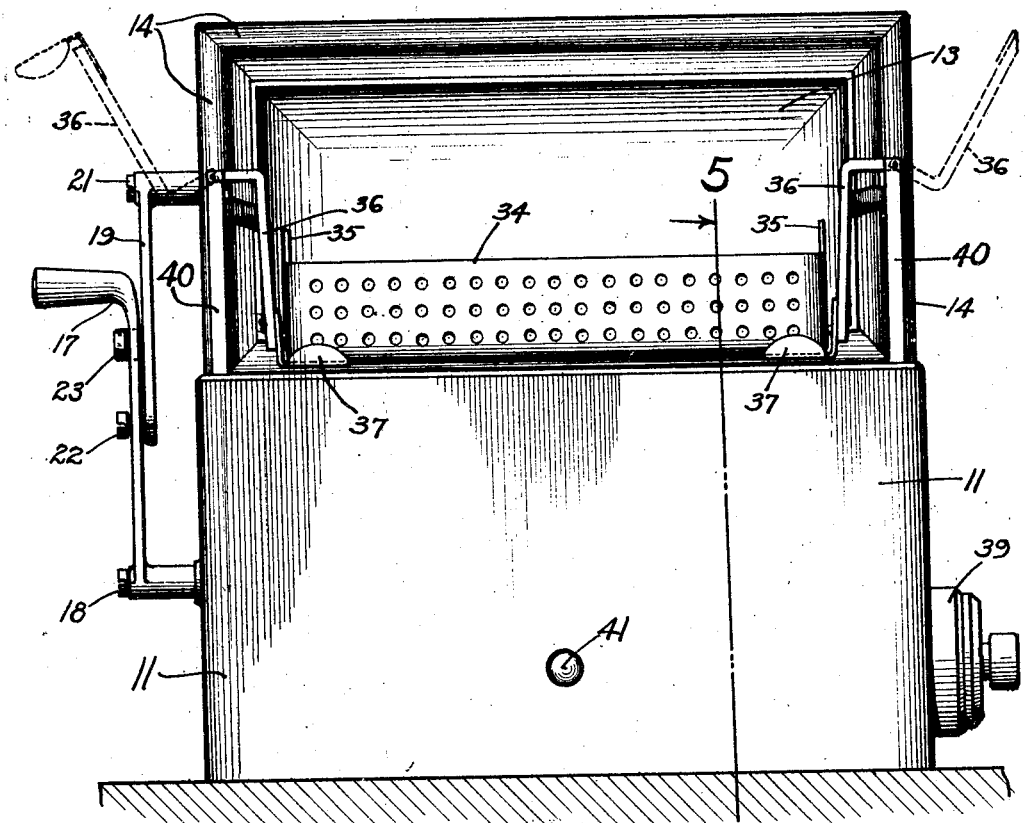
FIG. 1
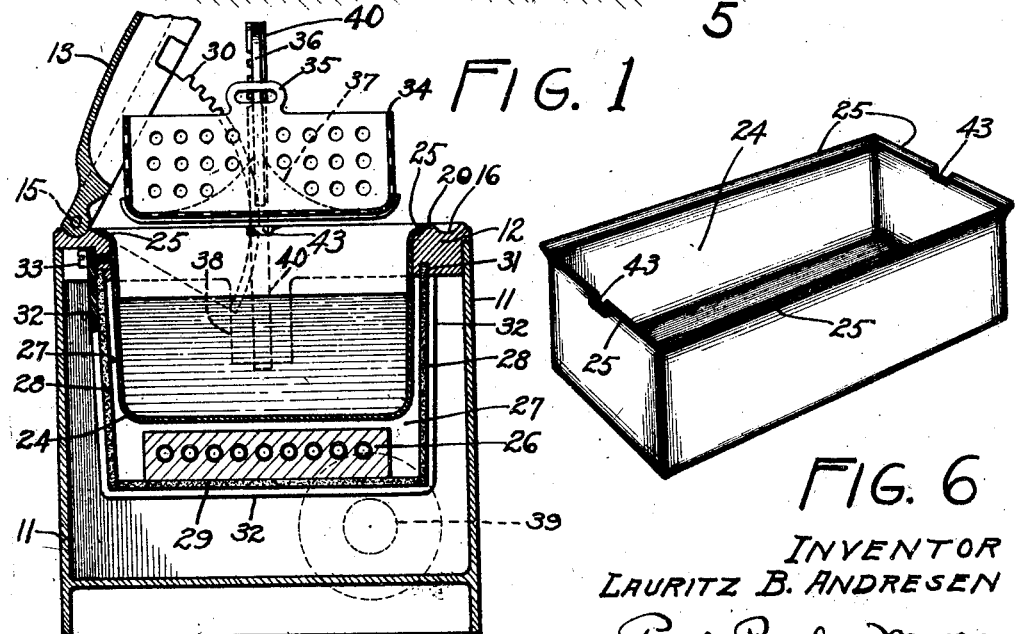
FIG. 5
FIG. 6
INVENTOR
LAURITZ B. ANDRESEN
By Paul, Paul & Moore
ATTORNEYS June 24, 1930.  L. B. ANDRESEN  1,767,034
STERILIZER
Filed Sept. 1, 1923  2 Sheets-Sheet 2
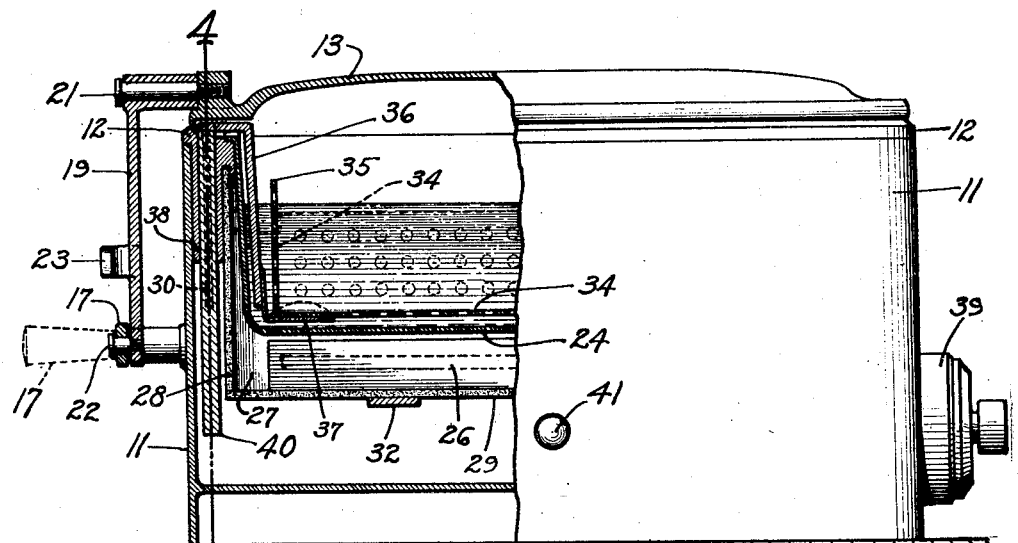
FIG. 2
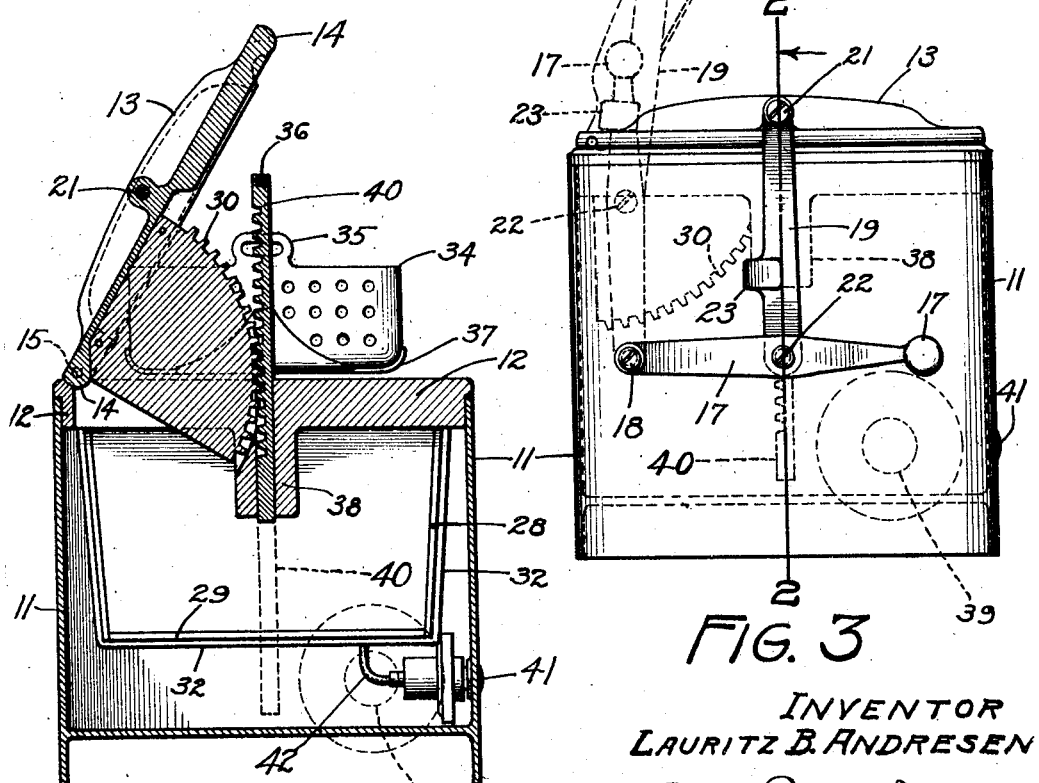
FIG. 3
FIG. 4
INVENTOR
LAURITZ B. ANDRESEN
By Paul, Paul + Moore
ATTORNEYS Patented June 24, 1930

1,767,034

UNITED STATES PATENT OFFICE

LAURITZ BREDENBERG ANDRESEN, OF MINNEAPOLIS, MINNESOTA, ASSIGNOR TO M. F. PATTERSON DENTAL SUPPLY COMPANY, OF ST. PAUL, MINNESOTA, A CORPORATION OF ILLINOIS

STERILIZER

Application filed September 1, 1923. Serial No. 660,609.

This invention relates to new and useful improvements in sterilizers such as are commonly employed by dentists and surgeons to sterilize their instruments before and after use, and more particularly relates to such sterilizers having a boiler containing a heated sterilizing liquid into which the instruments are submerged for sterilization.

An object of this invention is to provide a sterilizer having the boiler removably mounted therein so that it may readily be removed therefrom for cleaning or other purposes.

A further object of the invention is to provide a sterilizer having a perforated instrument tray mounted upon means adapted to raise and lower vertically such tray into and out of the sterilizing liquid each time the cover is opened and closed.

A further object is to provide a sterilizer having the heating element mounted within a heating chamber directly beneath the boiler thereof, such heating chamber also substantially surrounding the effective portion of the boiler and thereby greatly increasing the efficiency of the heating element.

A further object is to provide such an apparatus having a dead air space between the walls of the heating chamber and the walls of the outer casing, thereby preventing cold air from coming in direct contact with the walls of the heating chamber and also preventing the outer casing walls from becoming excessively warm when the heating element is functioning.

Other objects of the invention will more fully appear from the following description and the accompanying drawings, and will be pointed out in the annexed claim.

In the drawings there has been disclosed a structure designed to carry out the various objects of the invention, but it is to be understood that the invention is not confined to the exact features shown, as various changes may be made within the scope of the claim which follows.

In the drawings:

Figure 1 is a view in front elevation of a sterilizer with the invention applied thereto and showing the cover in open position and the perforated tray elevated out of the tank;

Figure 2 is a front view partially in section, showing the cover in closed position and the tray submerged in the heated liquid contained in the boiler of the sterilizer;

Figure 3 is an end elevation of the apparatus to show the means provided for opening and closing the cover;

Figure 4 is a transverse sectional view on the line 4—4 of Figure 2, showing the means provided for vertically elevating the perforated tray out of the boiler;

Figure 5 is a similar view on the line 5—5 of Figure 1, showing the tray in elevated position and also showing the heating element positioned beneath the removable boiler within the heating chamber; and Figure 6 is a perspective view of the boiler removed from the apparatus.

In the selected embodiment of the invention here shown, for purposes of disclosure, there is illustrated a sterilizer comprising a metallic casing 11, having a rectangular frame 12 suitably secured to the upper inner portion thereof, as shown in Figures 4 and 5. A cover 13, having a rounded or convexed marginal edge 14, is hinged to the frame 12 by the pivot pins 15. A complementary concaved seat 16 is preferably provided in the upper face of the frame 12 and is adapted to cooperate with the rounded edge 14 of the cover to provide a substantially steam tight joint when the cover is closed.

As shown in Figures 1, 2 and 3, the opening and closing of the cover is conveniently effected by means of a hand lever 17 pivotally mounted upon a pin 18 secured to the casing wall. A connecting link 19 is pivotally connected to the cover 13 by a pin 21 and depends therefrom and has its other end similarly connected to the hand lever 17 by means of the shouldered pin 22. An integral hook or lug 23 is preferably provided on the connecting link 19 to provide a stop for the hand lever 17 when in cover-opening position, as shown in full lines in Figure 1 and in dotted lines in Figure 3.

When the cover and hand lever have been thus positioned, it will be noted that the pivot pin 22 has passed beyond a straight line drawn through the pivot pins 18 and 21 a sufficient distance to prevent the cover from closing, the lever 17 being held against the stop lug 23 by the weight of the cover, tending to close. The above described cover opening and closing mechanism is common construction in sterilizers in use at the present time and therefore forms no part of the present invention.

An important feature of this invention resides in the novel construction and method of mounting the boiler containing the sterilizing liquid. This boiler 24, shown in Figure 6, is constructed of suitable non-corrodible and acid-proof metal such as Monel metal and is preferably formed from one piece of sheet metal, having all inside corners rounded, so that it may readily be kept clean and sanitary. An outwardly projecting flange 25, preferably inclined, is provided on the upper portion of the boiler, adapted to bear against the correspondingly inclined surface 20 of the frame 12 to support the boiler when positioned within the frame, as shown in Figures 2, 4 and 5. By the employment of this novel construction the boiler may readily and quickly be removed from the sterilizer for cleaning each time it has been used, which is desirable in order that the boiler may be kept clean and sanitary.

The means provided for heating the sterilizing liquid to the proper temperature consists preferably of an electric heating element 26, of ordinary construction, mounted within an insulated heating chamber 27 directly beneath the boiler, as shown in Figures 2 and 5. The walls 28 and bottom 29 of the heating chamber 27 are preferably constructed of suitable fireproof material such as asbestos. The side and end walls preferably have their upper edges inserted in a recess or groove 31, provided in the bottom face of the frame 12, and are secured thereto by means of a pair of metallic supporting members or brackets 32 secured to the frame by suitable screws 33. The bottom 29, to which the heating element 26 is secured, is supported upon the horizontal portions of the brackets 32.

Another important feature of this invention is the means provided for vertically raising and lowering the perforated instrument tray, in which the instruments are placed, into and out of the sterilizing liquid contained in the boiler 24, each time the cover 13 is opened and closed. This tray 34 is similarly constructed of a suitable non-corrodible and acid-proof metal and is also preferably integrally formed. Integral handles or finger grips 35 are provided at each end of the tray by means of which it may readily be removed from its supporting means for cleaning. As shown in Figures 1, 2 and 5, the tray is supported by means of a pair of opposed depending arms 36, having inwardly projecting plates 37 suitably secured to the lower portions thereof, adapted to support each end of the tray. The ends of the plates 37 are preferably upturned to prevent the tray from relatively changing its position thereon.

The novel means provided for vertically raising and lowering the tray 34 into and out of the boiler 24, consists preferably in the provision of a pair of gear segments 30 which are suitably secured to each end of the cover 13 as clearly shown in Figure 4. These gear segments are in engagement with a pair of vertically mounted complementary racks 40 reciprocally mounted in bearings 38 provided in the rectangular frame 12. As shown in the drawings, the tray supporting arms 36 are pivotally connected to the upper terminal ends of the two racks 40 in such a manner that, when the arms 36 are in normal position, they will be positioned as shown by full lines in Figure 1. From the foregoing it will be readily seen that, when the cover is opened, the gear segments 30, being in mesh with the vertical racks 40 will cause such racks to be upwardly moved in the bearings 38 with the resultant elevating of the tray 34 out of the sterilizing liquid to the position shown in Figures 1, 4 and 5. In like manner, when the cover is closed the tray will be vertically lowered into the sterilizing liquid, to the position shown in Figure 2, in which position the tray is substantially submerged in the liquid (usually water).

A variable heat control switch 39, of ordinary construction, is preferably provided at one end of the casing 11 for the purpose of controlling the flow of electrical energy through the heating element 26 in order to increase or decrease the amount of heat generated thereby with the consequent heating of the water contained in the boiler 24. By the employment of such a switch, in conjunction with this apparatus, the water may be quickly heated to the proper temperature to effect efficient and thorough sterilization and may be readily maintained at such temperature.

A small signal light 41, also of ordinary construction, is preferably mounted in the front wall of the casing 11 adjacent its lower edge. As shown in Figure 4, this light is electrically connected to the heating element 26 by the usual wires 42 so that whenever the heating element is functioning the light will be illuminated as a warning signal to the user that the control switch 39 is turned on and that electrical energy is flowing through the heating element.

When it is desired to remove the boiler 24 from the apparatus for cleaning or other purposes, the cover 13 will be opened to the position shown in Figures 1, 4 and 5. The perforated tray 34 may then be lifted from the supporting arms 36 by means of the finger grips 35. The arms 36 are then swung upwardly and outwardly to the position shown by dotted lines in Figure 1. When thus positioned the boiler 24 may readily be removed from the frame 12 by means of a pair of small hooks or instruments (not shown) in engagement with the notches 43 provided at each end of the boiler, as shown in Figure 6. Also, by mounting the heating element 26 within the heating chamber 27, a dead air space is provided around the heating chamber, thereby greatly increasing the heating efficiency of the heating element as a result of the cold air not coming in direct contact with the walls of the heating chamber. This improved construction also prevents the outer casing wall 11 from becoming excessively warm when the apparataus is in use.

Having thus described my invention what I claim as new and desire to secure by Letters Patent, is:

In a sterilizer, the combination of a cover thereon, rack-bars slidably mounted at opposed sides of the sterilizer, toothed means on the cover to engage each of the rack-bars whereby, upon raising of the cover, the rack-bars are raised, a holder for articles to be heated connected with the rack-bars, and heating means for the utensil.

In witness whereof, I have hereunto set my hand this 29th day of August, 1923.

LAURITZ BREDENBERG ANDRESEN.